Jan. 30, 1968   J. F. BENNETT   3,366,402
TRAILER HITCH
Filed Feb. 10, 1966
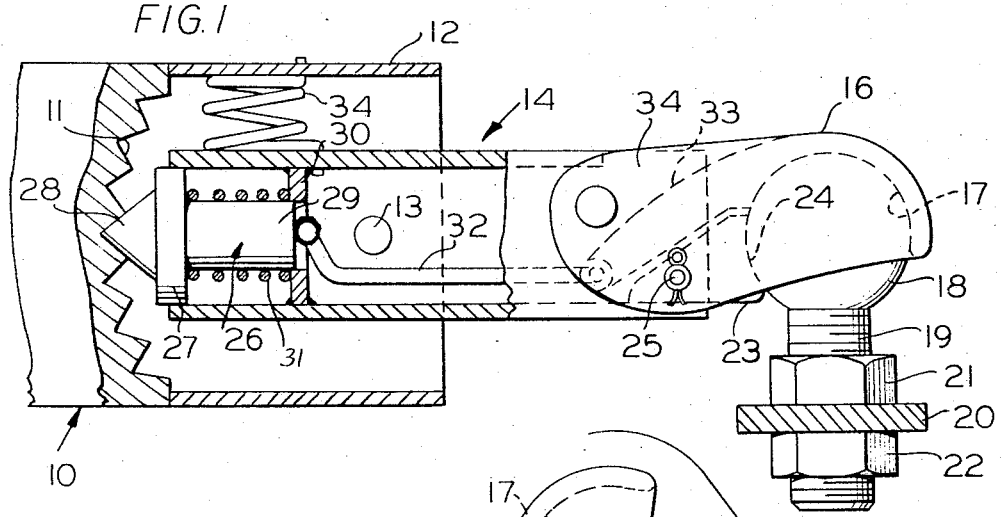
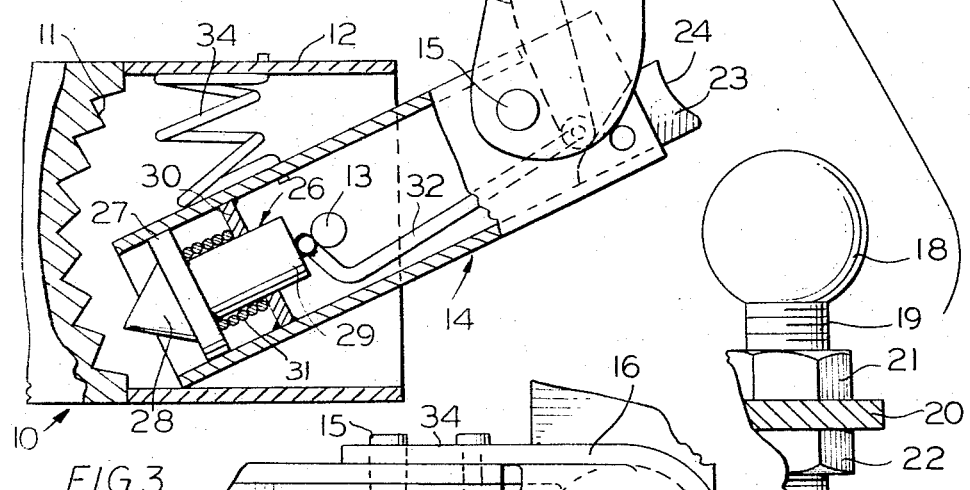
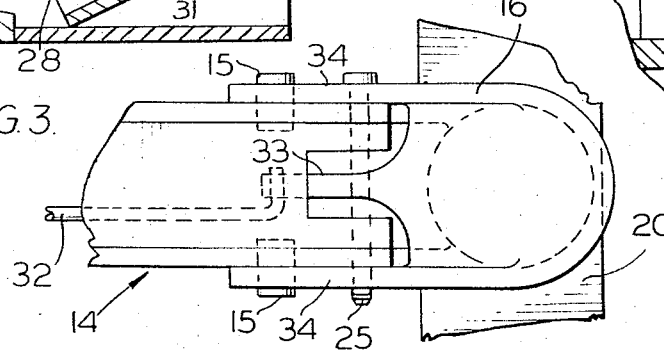
INVENTOR
JAMES F. BENNETT
*JKMcneill*
ATT'Y

United States Patent Office 3,366,402
Patented Jan. 30, 1968

3,366,402
TRAILER HITCH
James F. Bennett, Stockton, Calif., assignor to International Harvester Company, Chicago, Ill., a corporation of New Jersey
Filed Feb. 10, 1966, Ser. No. 526,551
4 Claims. (Cl. 280—512)

ABSTRACT OF THE DISCLOSURE

A ball and socket trailer hitch which adjusts itself, when unlocked, to the drawbar of whatever tractive vehicle is provided for towing the trailer, comprises a trailer tongue pivoted medially of its ends so that its forward socket end can swing vertically to engage hitch balls at different heights and its rear end can also swing correspondingly vertically. The rear end of the tongue has a spring biased detent automatically released when the tongue socket is uncoupled from the vehicle and automatically moved into locking engagement with selected vertically spaced complementary locking means on the trailer when the tongue socket is engaged with the ball.

---

This invention relates to hitches for tractor drawn trailers and the like, and particularly to a hitch of the ball and socket type.

The height of the drawbar or other hitch device of a tractor or other towing vehicle above the ground varies with different vehicles, requiring vertical adjustment of the trailer hitch. In connection with tilt-bed trailers, for example, to equalize the loading on all axles of a multi-axle trailer, the hitch must adjust vertically independently of the bed. Also, since some of the load must be carried on the hitch for optimum roadability, the trailer tongue must be rigid with the trailer bed for any given hitch height.

An object of this invention is the provision of a novel adjustable hitch for a trailer accommodating connection thereof to vehicles having different heights of drawbar and the like.

Another object of the invention is the provision of self-positioning ball and socket hitch mechanism for connecting a trailer to a tractive vehicle wherein the unlocked coupler adjusts itself to the height of the ball to be received in the coupler socket.

Other objects and advantages of this invention will become clear from the following detailed description when read in conjunction with the accompanying drawings, wherein:

FIGURE 1 is a cross-section showing the forward end of a trailer hitch frame and a hitch tongue in locked or operating position with respect to the hitch ball of a tractive vehicle;

FIGURE 2 is a sectional view similar to FIGURE 1 showing the unlocked or inoperative position of the coupling device of this invention; and, FIGURE 3 is a plan view of the forward end of the trailer hitch tongue.

In the drawings the numeral 10 designates the forward end of the hitch frame of a trailer, such as a conventional tilt-bed, the forward end of the hitch frame being provided with vertically spaced transverse notches or recesses 11 and a forward tubular extension 12 in which is mounted a transverse pivot pin 13. A tubular tongue 14 is pivotally mounted medially of its ends on pin 13 within the extension 12 and the forward end thereof carries pivot pins 15 upon which is mounted the bifurcated rear end of a hitch cap 16 having a socket 17 adapted to receive a spherical hitch ball 18 to dispose the trailer tongue in draft-receiving relation with respect to the tractor carrying the hitch ball.

The hitch ball 18 has a depending stem 19 adapted to be received in an opening in a conventional drawbar 20 carried by by the tractive vehicle, not shown. The stem 19 is threaded and some adjustment of the vertical position of the hitch ball is made by the provision of a pair of nuts 21 and 22 on opposite sides of the drawbar.

The coupler head 16 is shown in FIGURE 1 in its locked position with respect to the ball 18. In this position, in addition to the engagement by the downwardly opening socket portion 17 of the coupler head, the ball is engaged by a block 23 having an arcuate forward face 24 engaging a lower portion of the ball to prevent vertical displacement of the ball from the socket, block 23 being affixed, as by welding, to the tongue 14. The coupler 16 is releasably locked in operating position with respect to ball 18 by the provision of a locking pin 25 received in registering openings in tongue 14, coupler 16 and block 23. By removing pin 25, the coupler can be swung upwardly about its pivot 15 to release the hitch and disconnect the implement from the tractive vehicle.

The normal operating position of the trailer hitch of this invention is shown in FIGURE 1. Slidably received within the tubular rear end of tongue 14 is a detent 26 comprising a block portion 27 fitting the interior of the tongue and having a rearwardly projecting triangularly shaped head 28 received in a selected one of the recesses 11 to lock the tongue against pivoting about pin 13.

Detent 26 also includes a forwardly projecting stem portion 29 slidable in an apertured guide wall 30 affixed to the interior of the tongue. A spring 31 is confined between wall 30 and block 27 to bias the detent rearwardly into engagement in one of the recesses 11. The detent is locked in this position by the provision of a longitudinally extending control rod 32, the rear end of which is bent laterally and pivotally connected to the forward face of the stem 29 of the detent.

The forward end of control rod 32 is also bent laterally and pivotally received in an opening provided in a central web or lever member 33 forming a part of coupler head 16 and extending rearwardly and downwardly between the laterally spaced side plates 34 of the coupler head. With locking pin 25 in the position shown in FIGURE 1, a positive lock is provided for holding detent 26 in one of the recesses or notches 11. Upon release of the locking pin 25 and upward swinging of the coupler head 16 about its pivot 15, control rod 32 and detent 26 move forwardly to release the detent from the locking means provided by recesses 11. With unlocking of the coupler head, a coil spring 34 confined between the upper wall of extension 12 and the rear portion of the tongue 14 rearwardly of the latter's pivot 13, swings the forward end of the tongue and coupler head 16 upwardly to a non-operating position wherein the coupler head is above the level of the hitch ball on the tractive vehicle, the vehicle operator depressing the forward end of the tongue against the action of spring 34 to effect the engagement of the hitch ball in the coupler head. The coupling device is thus self-positioning in that, irrespective of the vertical position of the hitch ball, the coupling device is merely depressed by the operator until the hitch ball is received in the coupler head and the latter is locked, detent 26 seating itself in one of the notches 11.

It is believed that the construction and operation of the novel self-positioning trailer hitch of this invention will be clearly understood from the foregoing description. It should likewise be understood that the invention has been described in its preferred embodiment and that modifications may be made therein without departing from the spirit of the invention or the scope of the appended claims.

What is claimed is:

1. Ball and socket hitch means for connecting a trailer having a hitch frame to a tractive vehicle having a hitch ball thereon, comprising a longitudinally extending tongue pivotally mounted medially of its ends on the hitch frame for vertical swinging adjustment relative thereto, a coupler head pivotally mounted at the forward end of the tongue having a socket and swingable from an inoperative position to an operative position with said ball received in said socket to form a draft connection between the vehicle and the trailer, vertically spaced locking means carried by the trailer frame and complementary locking means on the rear end of said tongue, said last mentioned locking means being vertically movable with swinging of the tongue about its pivotal mounting on the hitch frame and cooperable in a plurality of vertically spaced positions with said first mentioned locking means to vary the vertical position of said tongue, said first mentioned locking means comprising a plurality of vertically spaced recesses formed in said hitch frame and said last mentioned locking means comprising retractable detent means slidably mounted on the tongue and operatively connected to said coupler head for longitudinal movement relative to said tongue into locking engagement in a selected one of said recesses upon swinging said coupler head to its operating position.

2. The invention set forth in claim 1, wherein spring means are provided between said hitch frame and said tongue to bias the forward end of the tongue upwardly.

3. The invention set forth in claim 1, wherein said tongue is tubular and said detent means is telescopically mounted in the rear end of the tongue for axial movement relative thereto and spring means are mounted in the tongue and operatively engages the detent means to bias the latter rearwardly into locking engagement with a selected one of said recesses.

4. The invention set forth in claim 3, wherein a control rod is pivotally connected at one end to said detent means and is pivotally connected at its other end to said coupler head and is effective upon swinging the coupler head to its inoperative position to retract said detent means.

References Cited

UNITED STATES PATENTS

| | | | |
|---|---|---|---|
| 2,522,616 | 9/1950 | Husek | 280—495 X |
| 2,609,212 | 9/1952 | McMurtrie | 280—495 |
| 2,628,126 | 2/1953 | Black | 280—462 |
| 2,884,261 | 4/1959 | Farr | 280—512 |
| 2,961,256 | 11/1960 | Hinrichsen et al. | 280—495 X |
| 2,902,294 | 9/1959 | Kirkpatrick | 280—512 |
| 3,046,038 | 7/1962 | Hollis | 280—512 |

BENJAMIN HERSH, *Primary Examiner.*

C. C. PARSONS, J. SIEGEL, *Assistant Examiners.*